United States Patent
Imai et al.

[11] 3,830,571
[45] Aug. 20, 1974

[54] AUTOMATIC FOCUSING DEVICE ALSO CAPABLE OF PHOTOMETRY

[75] Inventors: Toshifumi Imai, Yokohama; Kenji Onogi, Chigasaki, both of Japan

[73] Assignee: Nippon Kogaku K.K., Tokyo, Japan

[22] Filed: Dec. 19, 1972

[21] Appl. No.: 316,514

[30] Foreign Application Priority Data
Dec. 29, 1971  Japan.................. 46-2699

[52] U.S. Cl.............. 356/123, 95/10 C, 95/44 R, 250/201, 250/222, 356/72, 356/218
[51] Int. Cl............................ G01j 1/00, G01j 1/42
[58] Field of Search ......... 356/122, 123, 125, 126, 356/72, 218; 250/201, 235, 222; 95/10 C, 44 R

[56] References Cited
UNITED STATES PATENTS

| | | | |
|---|---|---|---|
| 2,999,436 | 9/1961 | Faulhaber | 356/126 |
| 3,511,155 | 5/1970 | Yamada | 356/125 |
| 3,599,552 | 8/1971 | Harvey | 250/201 |
| 3,688,673 | 9/1972 | Katsuyama | 356/123 |

*Primary Examiner*—Vincent P. McGraw
*Attorney, Agent, or Firm*—Shapiro and Shapiro

[57] ABSTRACT

In an automatic focusing device of the type employing photoconductors which are scanned relative to an image to be focused, parallel slit-like photoconductors are arrayed in a plane upon which the image is focused. Light from an object is passed through a focusing lens along an optical axis perpendicular to the photoconductor plane, and the photoconductors are vibrated in their plane, perpendicular to the length of the photoconductors, to produce output signals which vary with the change in photoconductivity and which are added to provide increased sensitivity. The output signals control a servomotor for positioning the lens along the optical axis. The photoconductors are also reciprocated along the optical axis to provide a peak signal which is compared with a position reference to determine the proper direction of lens movement for focusing. Averaged output signals provide photometric measurements for automatic exposure control.

12 Claims, 10 Drawing Figures

AUTOMATIC FOCUSING DEVICE ALSO CAPABLE OF PHOTOMETRY

BACKGROUND OF THE INVENTION

1. Field of the Invention

This invention relates to an automatic focusing device which is capable of detecting the focus while metering the quantity of light for automatic photometry.

2. Description of the Prior Art

Systems for automating focusing in various types of optical instruments have heretofore been proposed, but none of them is completely satisfactory. Such proposed systems include, for example, a system utilizing a photoconductive element whose resistance or photoelectromotive force presents an extreme value when an image is formed on the light receiving surface of the photoconductive element, a system using a declination prism (such as a split prism) to split an image into two upper and lower images and photoelectrically detect the registration between the upper and lower images, and a system which utilizes an extreme value of the variation in AC output caused by scanning a rotary or vibratory slit in front of a photoconductive element. The first-named system suffers from directionality in the focus detecting sensitivity of the photoconductive light receiving element, and in spite of the great efforts made to eliminate such directionality, this system has not yet been put into practice. The second-named system cannot provide a sufficient detecting sensitivity, and is not useful at all in case of microscopes in which the beam of image forming light is extremely thin. In the third-named system, the slit must be extremely thin in order to improve the focus detecting sensitivity, but a thinner slit results in a smaller output from the photoconductive element and lower S/N ratio of the output signal unless the image or the object is extremely bright. Thus, this system is again impracticable. If a highly sensitive element such as photomultiplier were employed to avoid the above problem, the available range of brightness of the object or the image would be so limited that it would be impossible for ordinary optical instruments to follow the variation in the illumination of the image, which may vary by as much as 100,000 times. In any of these systems, the signal produced by the photoconductive light receiving element for a variation in the brightness of an image or an object contains a variation of DC level corresponding to said variation in the brightness. To eliminate such varying DC level, the above-described systems must employ a beam splitter (for laterally directing the optical path) together with a diffusing plate and an additional photoconductive element equivalent to the focus detecting photoconductive element to produce a DC output corresponding to the brightness of the image which is subtracted from the signal produced by the focus detecting element. This very much complicates the electrical circuit arrangement. Also, the quantity of light reduced by the beam splitter may reduce the focus detecting sensitivity.

SUMMARY OF THE INVENTION

It is an object of the present invention to provide an automatic focusing device of sufficiently high focusing sensitivity so as to eliminate the above-noted disadvantages and which can also serve as an automatic light-measuring or exposure determining device.

According to an embodiment of the present invention, the automatic focusing device comprises an image forming lens for forming an image of an object on an image forming plane, and a planar photoconductive means for receiving a beam of image-forming light passed through the image forming lens to produce an electrical output signal corresponding to such light. The photoconductive means includes a photoconductor whose resistance valve is variable with the light impinging thereon, the photoconductor being masked by spaced electrodes to form a pair of parallel and substantially coextensive slit-like photoconductors. The spaced electrodes comprise a first conductor electrically connected with one of the pair of slit-like photoconductors, a second conductor electrically connected with both of the pair of slit-like photoconductors, and a third conductor electrically connected with the other of the pair of slit-like photoconductors. A battery is connected with the first and third conductors. Means is provided for scanning an image past the photoconductors, by vibrating the photoconductive means in its plane, which is perpendicular to the optical axis of the lens, the vibrations being perpendicular to the photoconductors. The photoconductor means is also reciprocated along the optical axis. Maximum peak detector means is electrically connected with the second conductor to detect a maximum peak signal in the output signal from the second conductor. A servomotor is provided for moving the image forming lens along the optical axis thereof, and direction discriminator means is further provided for comparing the output of the maximum peak detector means with a position reference to determine the proper direction of rotation of the servomotor. Thus, the image forming lens may be moved in the direction for focusing the object on the image forming plane. The averaged output signal provides a measure of the light for purposes of automatic exposure control.

BRIEF DESCRIPTION OF THE DRAWINGS

The above object and other features of the present invention will become fully apparent from the following detailed description taken in conjunction with the accompanying drawings, in which.

DESCRIPTION OF THE PREFERRED EMBODIMENTS

Figure 1A:
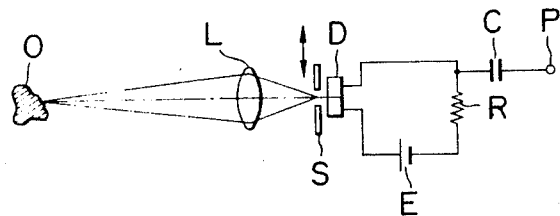
FIGS. 1(a)–1(c) illustrates a focus detecting system according to the prior art, FIG. 1(a) showing the principle thereof, FIG. 1(b) showing the equivalent circuit of the detector element therein, and FIG. 1(c) showing the relations between the slit, the detector element and the image of an object.

Referring to FIG. 1(a), there is shown a conventional focus detecting system of the frequently proposed type which employs an ordinary photoconductive element D such as phototube, photodiode, phototransistor or the like, and a slit S disposed in front of the element D, the slit S being vibrated to thereby provide a focusing signal from the photoconductive element D. An object O may be imaged on the vibratory slit S through an image forming lens L. A battery E and a load resistor R are serially connected with the photoconductive element D so that an output signal may be taken from an output terminal P connected to one end of a resistor R by a capacitor C. The other output terminal (not shown) may be connected to the other end of the resistor. As the object O is imaged more clearly on the slit S through the image forming lens L, a signal of greater magnitude is obtained from the output terminal, which may be used to accomplish focusing.

Figure 1B:
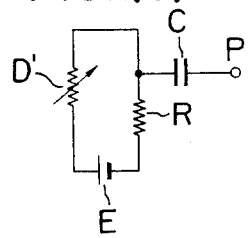
Figure 1C:
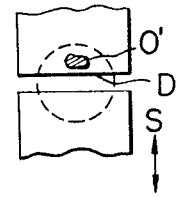

The electrical circuit of the photoconductive element and associated components may be redrawn in the manner shown in FIG. 1(b). The photoconductive element D can electrically be regarded simply as a variable resistor D'. The reason is that the quantity of light impinging on the photoconductive element D is variable with the vibrations of the slit S because the image O' of the object O is on and off the opening of the slit S, as shown in FIG. 1(c).

In FIG. 1(b), a signal voltage $P_1$ appearing at the output terminal P of the load resistor R will now be considered. Let the voltage of the battery E be $e$, the resistance value of the resistor R be $r_0$, the internal resistance of the photoconductive element D be $d$, and the variation in the terminal resistance of the photoconductive element D corresponding to the variation in the quantity of light caused by the vibrations of the slit S be $\Delta d$. Then, as is well known, the amplitude $P_1$ of the output signal will be expressed:

$$P_1 = r_0 \cdot \Delta d \cdot e / \{(r_0 + d)(r_0 + d + \Delta d)\} \quad (1)$$

As is also well known, a greater amplitude of output signal is provided when the load resistance $r_0$ and the internal resistance $d$ are equal. When $r_0 = d$, $$P_1 = \Delta d \cdot e / \{2(2d + \Delta d)\} \quad (2)$$

Thus, the amplitude of the output signal produced with the vibrations of the slit S is expressed by $P_1$ in the equation (2) above.

Figure 2A:
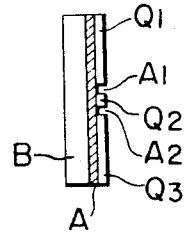
FIGS. 2(a)–2(d) illustrates an embodiment of a focus detector element for an automatic focusing device according to the present invention, FIG. 2(a) being a sectional view of the detector element, FIG. 2(b) being a plan view of the same element with a voltage source and output terminal connected therewith, FIGS. 2(c)–(I) to (V) being plan views of the same element showing various positions of the image formed on the element, and FIGS. 2(d)–(I) to (II) showing the equivalent circuit of the same element.
Figure 2B:
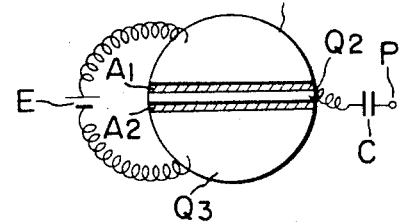

FIGS. 2(a) and (b) diagrammatically show the photoconductive element of the present invention, FIG. 2(a) being a sectional view thereof and FIG. 2(b) being a top plan view showing the electrical conncetions thereto. Letter A designates a photoconductor such as CdS or CdSe which is intimately attached to a base plate B of a material such as steatite or quartz. The photoconductor is masked with gold or other suitable conductor as at Q1, Q2 and Q3 by evaporation, photoetching or other known method, in such a manner that the photoconductor forms two parallel slit-like photoconductors or photoconductor lines A1 and A2. The conductor masks Q1, Q2 and Q3 are independent of one another and serve also as electrodes. As shown in FIG. 2(b), a suitable battery E is connected with the conductors Q1 and Q3. The photoconductive element may be vibrated by a known means in the direction of the double-headed arrow, i.e., in a direction which is in the plane of and substantially perpendicular to the length of the two parallel slit-like photoconductors A1 and A2, so that an electrical signal appearing in the conductor Q2 may be taken out from the output terminal P (with respect to Q1 or Q3) through a suitable capacitor C. When the image O' of the object O is clearly formed on the photoconductive element as shown in an enlarged scale in FIG. 2(c), which corresponds to FIG. 1(c), the photoconductive element and the image O' repeat the various relative positions (I), (II), (III), (IV) and (V) with the vibrations of the element. FIG. 2(b) may be regarded as electrically equivalent to (I) and (II) in FIG. 2(d). In other words, the slit-like photoconductors between the electrodes Q1 and Q2 and between Q2 and Q3 are discrete resistors A1 and A2 or A3 and A4 which are serially connected with the battery E, and the central conductor Q2 corresponds to the mid-point between those resistors. Through this conductor Q2, the signal is taken out from the output terminal P via the capacitor C as shown in FIG. 2(b), but no potential variation will appear at the output terminal P in the case of FIG. 2(c)-(I) where the image O' of the object O is off the slit-like photoconductors. The position of FIG. 2(c)-(II) is reached with the vibration of the photoconductive element, and this position electrically corresponds to the position of FIG. 2(d)-(I), where a potential appears at the output terminal P. For the comparison with the aforesaid prior art case, it is now assumed in FIG. 2(d)-(I) that the resistance values of the photoconductors A2 and A1 are $r_0$ and $d$, respectively, and that the variation in the resistance value $d$ in the position of FIG. 2(c)-(II) is $\Delta d$. Then, the amplitude $p_2$ of the output signal appearing at the output terminal P is:

$$p_2 = r_0 \cdot \Delta d \cdot e / \{(r_0 + d)(r_0 + d + \Delta d)\}$$

where $e$ is the electromotive force of the battery E.

If the photoconductor A is of substantially uniform thickness and the two slit-like photoconductors are substantially equal in width, the resistance value between the electrodes Q1 and Q2 and that between the electrodes Q2 and Q3 may be regarded as substantially equal. If $r_0 = d$ in the foregoing equation, $$p_2 = \Delta d \cdot e / \{2(2d + \Delta d)\} \quad (3)$$

Figure 2C:
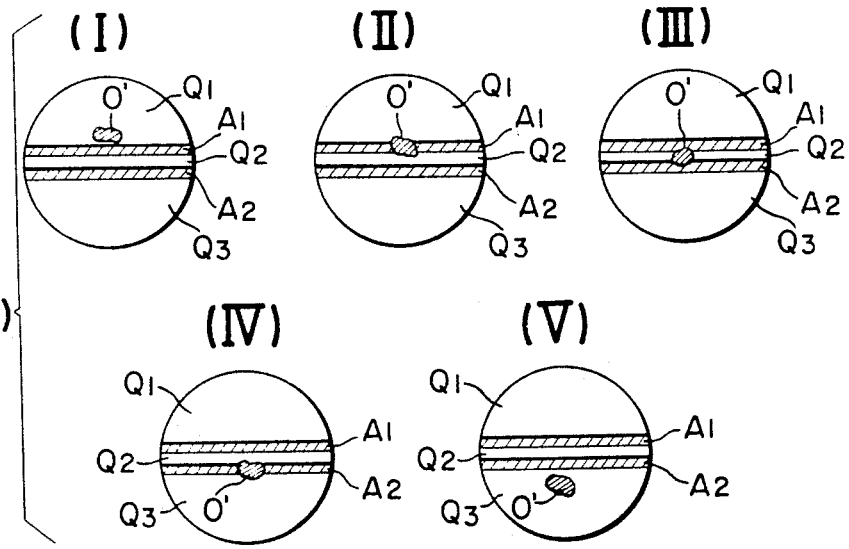
Figure 2D:
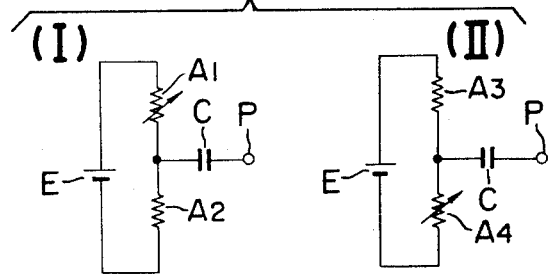

When further vibration brings about the position of FIG. 2(c)-(III), the potential at the output terminal P comes back to the condition of FIG. 2(c)-(I).

When still further vibration brings about the position of FIG. 2(c)-(IV), the amplitude of the output signal from the output terminal P will become:

$$p_3 = -\Delta d \cdot e / 2(2d + \Delta d),$$

where the negative sign (−) shows that the potential is displaced in the direction opposite to that in the case of FIG. 2(c)–(II).

Further, when the position of FIG. 2(c)–(V) is reached, the potential at the output terminal P comes back to the original condition.

Amplitude $p_4$ of the output signal produced with the vibrations of the photoconductive element of the present invention is the sum of the aforesaid two amplitudes, that is, $$p_4 = d \cdot e / (2d + \Delta d) \qquad (4)$$

As will be apparent, when equations (3) and (4) are compared, the electrical output signal provided by the focus detector element of the present invention is very great in magnitude and highly sensitive, and thus has a sufficient detecting ability even for objects of low contrast which could not sufficiently be detected according to the prior art.

Figure 3:
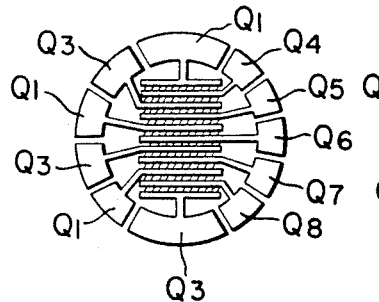
FIG. 3 shows another embodiment of a focus detector element according to the present invention.
Figure 4:
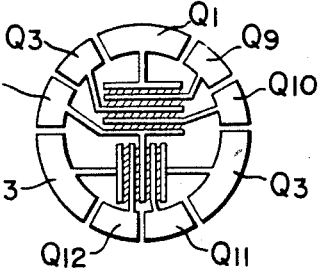
FIG. 4 shows still another embodiment of a focus detector element.

Optical instruments encounter a wide range of variation in brightness of object and a wide range of variation in apparent internal resistance of ordinary photoconductive detector element. Accordingly, the various systems heretofore proposed have encountered difficulties in efficiently deriving output signals although the extraneous load resistance has been made equal to the apparent internal resistance of the photoconductive element. In contrast therewith, according to the present invention, the photoconductive element is formed into two parallel slit-like openings which are equally subjected to light, thus overcoming the described disadvantages and ensuring signals to be taken out efficiently. Further, the photoconductive element may also comprise a plurality of detector portions arrayed on a single base plate as shown in FIGS. 3 or 4, where the photoconductor is intimately attached only to the central rectangular section of the base plate. In FIG. 3, a battery is connected with electrodes Q1 and Q3, and the entire photoconductive element may be vibrated in its plane perpendicularly to the length of the slit-like photoconductors, whereby signal voltages similar to the signal voltage in the elctrode Q2 will be produced in the electrodes Q4, Q5, Q6, Q7 and Q8 which are similar in function to the electrode Q2. By using a known circuit for adding such signal voltage outputs, it will be feasible to provide a focus detection output of still greater magnitude. Alternatively, a plurality of pairs of slit-like photoconductors may be arrayed in the manner as shown in FIG. 4, and vibratory force may be imparted to the entire element not in a single direction but in two directions perpendicular to the lengths of the orthogonal slit-like photoconductors so that the element is vibrated in all directions so as to depict a Lissajous' figure, whereby sensitivity differences which would result from a single orientation of the slit-like photoconductors may be eliminated as will be readily apparent.

Further, the present invention proposes to employ such a focus detecting photoconductive element also as the exposure detector in an automatic exposure determining device for picture-taking. In other words, the vibratory detector element of the present invention provides a focus detecting signal when an AC component is taken out from the output terminal through a capacitor as described previously, whereas it is apparent that the current flowing through the voltage-applying electrodes such as electrodes Q1 and Q3 is an overlap of an AC component corresponding to the variation in the brightness of the photoconductive element caused by the vibration thereof and a DC component directly proportional to the brightness of the image. Therefore, the average time value of such overlap current would be proportional to the average brightness of the image, and the measurement of such current or the use of it as an input signal to well-known automatic exposure determining circuits would enable exposure determination to be automatically accomplished. Thus, according to the present invention, it is very easy to provide an optical instrument which can automatically accomplish both focusing and exposure determination by means of a single photoconductive element, and the user of the optical instrument is only required to determine the composition of a picture or to carry out so-called "framing." Of course, this is widely useful for cameras and microscopes and even for industrial television cameras and ordinary television cameras.

Figure 5:
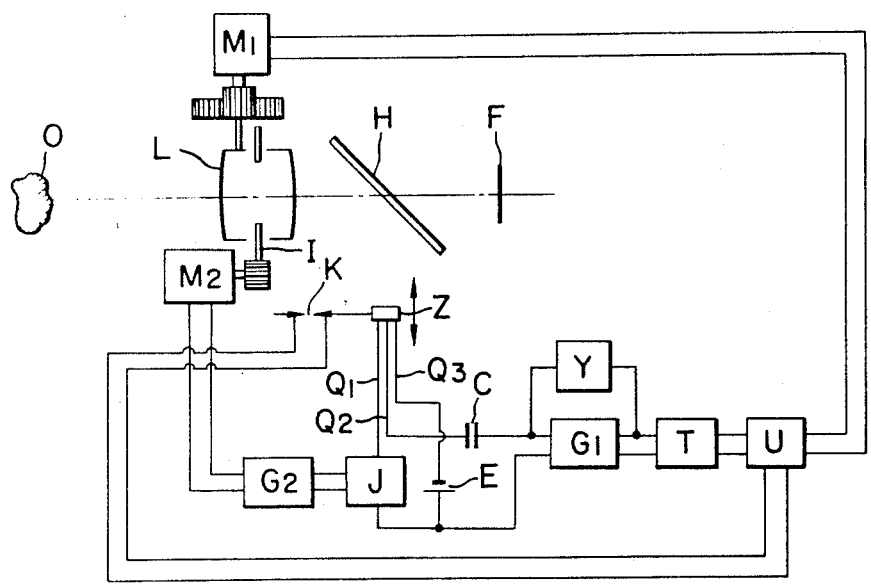
FIG. 5 shows, in block diagram, an example of an automatic focusing optical instrument incorporating the focus detector element of the present invention and an automatic exposure device.

FIG. 5 shows an embodiment of an entire system for focus detection and automatic exposure according to the present invention. In a camera, microscope or other optical instrument, it is desired, for example, that the image of an object O be sharply formed by a lens L at a predetermined position F on an image forming plane, such as the focal plane of an eyepiece or on a film surface, as shown in FIG. 5. A half-mirror H or the like is interposed between the lens L and the predetermined position F so as to bend the optical path toward the photoconductive element Z of the present invention. The photoconductive element Z, whose light receiving surface and electrode structure are such as described above, is vibrated in its plane (which is perpendicular to the optical axis extending from mirror H thereto) substantially perpendicularly to the length of the slit-like photoconductors formed thereon, and also reciprocated along the optical axis by a known means (not shown), to thereby seek the focal point. A battery E and a current detector J are connected with the photoconductive detector element Z in the manner as shown. The output of the current detector J is amplified by a well-known automatic exposure amplifier G2 which functions to obtain the average time value of the current, and then the output enters an iris diaphragm servomotor M2 to open and close an iris diaphragm I. A capacitor C is connected with the focus output terminal of the photoconductive detector element Z to apply a signal as the input to an automatic focusing amplifier G1. Connected with the automatic focusing amplifier G1 is an automatic gain control Y to control the gain of the amplifier G1, the control Y having a time constant substantially equal to the period of the focus-seeking reciprocative movement of the photoconductive detector element Z. The maximum peak output of the amplifier G1 is detected by a maximum peak detector T and applied in the form of a pulse-like input to a direction discriminator U. Connected with the direction discriminator U is a switch K adapted to conduct only when the photoconductive element Z is in a position conjugate with the predetermined position F with respect to the lens L. The conduction of the switch K and the pulse detected from the peak detector are compared with each other to effect direction discrimination. The output of the direction discriminator is connected with the automatic focusing servomotor M1 which is rotated in normal or reverse direction, so that a rack and pinion arrangement attached to the lens L and servomotor M1 causes the lens L to be moved forward or backward along the optical axis.

In the above-described construction, it is apparent that during the vibrations of the photoconductive element Z of the present invention in the direction perpendicular to the slit-like photoconductors thereof and the simultaneous reciprocation of the element Z along the optical axis to seek the focal point, the output of the photoconductive element Z is maximum when the image of the object by the lens L is most clearly formed on the element Z. Therefore, focusing would be accomplished by moving the lens L along the optical axis with the maximum output signal position of element Z as a clue. However, it often happens that the object O looks like several images overlapping along the optical axis. In such cases, there are correspondingly several summits or peaks in the magnitude of the output signal from the photoconductive element Z. As mentioned above, however, such signal is amplified by the automatic focusing amplifier G1 with the automatic gain control Y having a time constant substantially equal to the period of the focus-seeking reciprocative movement of the element Z, and the maximum peak value among the several peaks is detected by the maximum peak detector T with the aid of the automatic gain control Y. The direction discriminator U compares the maximum peak position with the signal from the aforesaid switch K to thereby provide a servo-signal whose magnitude is determined by the time interval between the maximum peak signal and the signal from switch K and whose sign (positive or negative) is determined by the time lag or advance between the two signals. The servo-signal thus provided is applied as the input to the automatic focusing servomotor M1. By setting the positive or the negative of the signal to produce the proper servomotor direction for focusing and by pre-adjusting so as to ensure that the focus is registered with the predetermined position F when the signal from switch K and the maximum peak are in accord with each other, the automatic focusing servomotor M1 will move the lens L along the optical axis in accordance with the above-described signal until the maximum peak position is in accord with the signal from switch K, thus providing automatic focusing. Also, as seen in FIG. 5, the output from the current detector J varies with the average time value of the current, and is applied by the well-known automatic exposure amplifier G2 (whose time constant is substantially equal to the period of the focus-seeking reciprocative moment of the photoconductive element Z of the present invention) to the iris diaphragm servomotor M2 to open and close the iris diaphragm I, thus accomplishing automatic exposure control. It will be apparent that the automatic exposure amplifier G2 can control the effect of such factors as film sensitivity, shutter speed, etc. when employed with cameras and that the output of the amplifier G2 can regulate the brightness of a light source. Moreover, such output may be read by a meter to determine the exposure.

Thus, according to the present invention, it is very easy to provide an optical instrument in which both focusing and exposure determination can be automatically accomplished by a singel photoconductive element. Further, such element can be formed of a photoconductive material such as $CdS$ or $CdSe$ through a simple known process such as evaporation or photoetching. Thus, the use of a single element for focusing and exposure determination reduces the number of mechanical components required and lends itself to the provision of an optical instrument with highly reliable automatic exposure and focusing devices which are not affected by vibrations, environmental conditions, etc.

The conventional focus detecting systems have required not only a photoconductive element for focus detection but also an additional photoconductive element of the identical type for eliminating a DC signal level corresponding to the variation in the brightness of the image, and have required further additional elements such as beam splitter, diffusing plate, etc., whereas the present invention requires none of these additional elements and thus can provide a reliable focus detecting device at a lower cost.

The user of an optical instrument provided with the two devices is only required to determine the composition of a picture to be taken, i.e., to carry out framing. Thus, the present invention is not only highly useful for cameras, microscopes, industrial television cameras and ordinary television cameras but is applicable generally to the optical arts, including various unmanned or automated optical instruments, optical installations for high radioactivities, high- or low-temperature optical instruments, etc.

We claim:

1. An automatic focusing device comprising a plurality of narrow photoconductors in a plane, means for forming on said photoconductors an image to be focused, means for vibrating said image in said plane transversely relative to said photoconductors, means for producing a signal dependent upon the variation of conductivity of said photoconductors in response to said vibrating, and means for adjusting said image forming means in response to said signal in order to focus said image.

2. A device in accordance with claim 1, wherein said photoconductors comprise a plurality of parallel lines of photoconductive material and wherein said image is vibrated perpendicular to said lines.

3. A device in accordance with claim 2, wherein said signal producing means comprises electrode means for applying a potential across said plurality of lines and for deriving a potential between lines.

4. A device in accordance with claim 2, wherein said photoconductors comprise a second plurality of parallel lines of photoconductive material in the same plane as but orthogonal to the first-mentioned lines, and wherein said image is also vibrated perpendicular to the second plurality of lines and in the plane thereof.

5. A device in accordance with claim 1, wherein said photoconductors are defined by slit-like separations between conductive electrodes supported upon a photoconductive layer.

6. A device in accordance with claim 1, wherein said means for vibrating said image relative to said photoconductors comprises means for vibrating said photoconductors.

7. A device in accordance with claim 1, wherein said adjusting means comprises a servomotor coupled to said image forming means and means for driving said servomotor in response to said signal.

8. A device in accordance with claim 7, further comprising means for reciprocating said photoconductors along the optical axis of said image forming means and means for producing a position reference dependent upon the position of said photoconductors along said optical axis, and wherein said means for driving said servomotor comprises peak detector means for detecting the maximum peak of said signal, and direction discriminating means for comparing said position reference with the output of said peak detector means in order to determine the direction of operation of said servomotor to achieve focusing of said image.

9. A device in accordance with claim 8, wherein said driving means comprises amplifier means for amplifying said signal before application to said peak detector means, said amplifier means having automatic gain control means with a time constant substantially the same as the period of reciprocation of said photoconductors.

10. A device in accordance with claim 8, wherein said image forming means comprises a lens, and further comprising beam splitter means for splitting light passed through said lens along two paths, one of which extends to said photoconductors and the other of which extends to an image forming plane, and wherein said position reference producing means produces said position reference when said photoconductors are in a position along said optical axis conjugate to said image forming plane with respect to said lens.

11. A device in accordance with claim 1, further comprising means for averaging a signal dependent upon the conductivity and conductivity variation of said photoconductors to measure the light which forms said image.

12. A device in accordance with claim 11, further comprising means responsive to the averaged signal for controlling the amount of light reaching said image forming plane.

* * * * *